United States Patent
Oishi et al.

(10) Patent No.: US 10,101,635 B2
(45) Date of Patent: Oct. 16, 2018

(54) BLADE DRIVE DEVICE AND OPTICAL APPARATUS

(71) Applicant: SEIKO Precision Inc., Matsudo-shi, Chiba (JP)

(72) Inventors: Seiichi Oishi, Matsudo (JP); Shoichi Tokura, Matsudo (JP)

(73) Assignee: SEIKO PRECISION INC., Matsudo-Shi, Chiba (JP)

( * ) Notice: Subject to any disclaimer, the term of this patent is extended or adjusted under 35 U.S.C. 154(b) by 0 days.

(21) Appl. No.: 15/050,954

(22) Filed: Feb. 23, 2016

(65) Prior Publication Data
US 2016/0282704 A1 Sep. 29, 2016

(30) Foreign Application Priority Data
Mar. 27, 2015 (JP) .................... 2015-066192

(51) Int. Cl.
*G03B 9/58* (2006.01)
*G03B 9/42* (2006.01)

(52) U.S. Cl.
CPC ................ *G03B 9/58* (2013.01); *G03B 9/42* (2013.01)

(58) Field of Classification Search
CPC ................................... G03B 9/40; G03B 9/00
USPC ........................................................ 396/493
See application file for complete search history.

(56) References Cited

U.S. PATENT DOCUMENTS

| | | | |
|---|---|---|---|
| 6,530,703 B2 * | 3/2003 | Nakano | G03B 9/18 396/456 |
| 7,699,542 B2 * | 4/2010 | Watanabe | H04M 1/0264 396/448 |
| 7,961,246 B2 * | 6/2011 | Watanabe | H04N 5/2254 348/362 |
| 8,317,417 B2 * | 11/2012 | Viglione | G03B 9/10 396/453 |
| 9,069,231 B2 * | 6/2015 | Oishi | G03B 9/40 |
| 2002/0197078 A1 * | 12/2002 | Toyoda | G03B 9/18 396/484 |
| 2004/0258405 A1 * | 12/2004 | Shiratori | G03B 9/14 396/458 |
| 2008/0267615 A1 * | 10/2008 | Nishio | G03B 9/36 396/453 |
| 2012/0141113 A1 * | 6/2012 | Inukai | G03B 9/36 396/502 |

FOREIGN PATENT DOCUMENTS

JP 2008-058400 A 3/2008

\* cited by examiner

*Primary Examiner* — Clayton E Laballe
*Assistant Examiner* — Linda B Smith
(74) *Attorney, Agent, or Firm* — Brinks Gilson & Lione

(57) ABSTRACT

To provide a blade drive device capable of suppressing variations in movement speed of blades at the time of continuous operation and shortening the operation interval of blades. A blade drive device 10 includes a bed plate 11 having an opening 12, a blade receiving plate 15 arranged so as to face the bed plate 11, a plurality of blades 31*b* to 34*b* provided between the bed plate 11 and the blade receiving plate 15, which are expanded in a state where the opening 12 is closed and are housed while overlapping one another in a state where the opening 12 is opened and a regulating member 80 having an abutting surface 82 on which side edge portions 31*b*1 to 34*b*1 of the blades 31*b* to 34*b* abut when the blades are housed. The abutting surface 82 is an inclined surface 83 inclined to the bed plate 11 side as it goes from the bed plate 11 side to the blade receiving plate 15 side.

6 Claims, 6 Drawing Sheets

BLADE DRIVE DEVICE AND OPTICAL APPARATUS

RELATED APPLICATIONS

This application claims priority under 35 U.S.C. § 119 to Japanese Patent Application No. 2015-066192 filed on Mar. 27, 2015, the entire content of which is hereby incorporated by reference.

BACKGROUND OF THE INVENTION

1. Field of the Invention

The present invention relates to a blade drive device and an optical apparatus.

2. Description of Related Art

In optical apparatuses such as a digital camera and a still camera, a blade drive device having a driving member for driving blades is adopted. The blade drive device has a base plate (bed plate) having an opening, a front curtain shutter blade group and a rear curtain shutter plate group which open and close the opening (for example, refer to JP-A-2008-58400 (Patent Document 1)).

Incidentally, it is required to shorten the operation interval of blades at the time of continuous operation in the blade drive device in recent years for improving the number of frames (frame speed) which can be imaged per a unit time. In order to shorten the operation interval of blades, it is important to suppress variations in movement speed of blades at the time of continuous operation. In order to suppress variations in movement speed of blades at the time of continuous operation, it is effective to stably set initial positions of blades before the expansion at prescribed positions in each operation.

However, no consideration is made for the initial positions of blades in the related-art blade drive device. Therefore, there is room for improvement in a point that variations in movement speed of blades at the time of continuous operation is suppressed to shorten the operation interval of blades.

SUMMARY OF THE INVENTION

The present invention has been made in view of the above problems, which provides a blade drive device and an optical apparatus capable of suppressing variations in movement speed of blades at the time of continuous operation to thereby shorten the operation interval of blades.

According to an embodiment of the present invention, there is provided a blade drive device including a bed plate having an opening, a blade receiving plate arranged so as to face the bed plate, a plurality of blades provided between the bed plate and the blade receiving plate, which are expanded in a state where the opening is closed and are housed while overlapping one another in a state where the opening is opened, and a regulating member having an abutting surface on which side edge portions of the blades abut when the blades are housed, in which at least part of the abutting surface is an inclined surface inclined to the bed plate side as it goes from the bed plate side to the blade receiving plate side.

According to the present invention, as the regulating member having the abutting surface on which side edge portions of the blades abut when the blades are housed is included, positions of the side edge portions of respective blades in the moving direction are regulated by the regulating member when the blades are housed. Accordingly, the initial positions of the blades in the moving direction can be determined without variations in each operation.

Moreover, at least part of the abutting surface is the inclined surface inclined to the bed plate side as it goes from the bed plate side to the blade receiving plate side, therefore, the blades abutting on the inclined surface move toward the bed plate side. Accordingly, at least part of blades can contact one another at prescribed positions, therefore, sliding resistance in respective blades which contact one another occurring when the blades are expanded and moved can be stabilized in each operation. The initial positions in the moving direction can be determined without variations as well as the sliding resistance in respective blades which contact one another occurring when the blades are expanded and moved can be stabilized as described above, therefore, it is possible to suppress variations in movement speed of blades at the time of continuous operation and to shorten the operation interval of blades.

The inclined surface may be provided in an end portion of the regulating member in the blade receiving plate side.

According to the present invention, as the inclined surface is provided in the end portion of the regulating member in the blade receiving plate side, therefore, the blades can be moved from the blade receiving plate side toward the bed plate side when the blades are housed. Accordingly, respective blades can contact one another at prescribed positions over an area from the blade receiving plate side to the bed plate side, therefore, the sliding resistance in respective blades which contact one another occurring when the blades are expanded and moved can be stabilized in each operation. Consequently, it is possible to suppress variations in movement speed of blades at the time of continuous operation and to shorten the operation interval of blades.

The inclined surface may be provided on the entire surface of the abutting surface.

According to the present invention, as the inclined surface is provided on the entire surface of the abutting surface, all blades can be positively moved from the blade receiving plate side toward the bed plate side when the blades are housed. Accordingly, respective blades can contact one another at prescribed positions over the area from the blade receiving plate side to the bed plate side, therefore, the sliding resistance in respective blades which contact one another occurring when the blades are expanded and moved can be stabilized in each operation. Consequently, it is possible to suppress variations in movement speed of blades at the time of continuous operation and to shorten the operation interval of blades.

The abutting surface may be held by a main body of the regulating member, and the hardness of the abutting surface may be higher than the hardness of the main body.

According to the present invention, the hardness of the abutting surface is higher than the hardness of the main body, therefore, the blades can be slid on the inclined surface smoothly while suppressing generation of dust such as abrasion powder when the blades abuts on the abutting surface of the regulating member at the time of housing the blades. Therefore, the blade drive device with high reliability capable of further shortening the operation interval of blades can be obtained.

The main body of the regulating member may be formed of an elastic member.

According to the present invention, the main body of the regulating member is formed of the elastic member, therefore, the impact generated when the blades abut on the abutting surface of the regulating member at the time of housing the blades can be absorbed by the main body of the regulating member. Accordingly, it is possible to prevent damage on the blades, which can improve the durability of the blade drive device.

According to the embodiment of the present invention, there is provided an optical apparatus including a blade drive device of any one of the above.

According to the present invention, variations in movement speed of blades at the time of continuous operation can be suppressed and the operation interval of blades can be shortened, therefore, a high-performance optical apparatus with a high frame speed can be obtained.

According to the present invention, the regulating member having the abutting surface on which side edge portions of the blades abut when the blades are housed is included, the positions of the side edge portions of respective blades in the moving direction are regulated by the regulating member when the blades are housed. Accordingly, the initial positions of the blades in the moving direction can be determined without variations in each operation.

Moreover, at least part of the abutting surface is the inclined surface inclined to the bed plate side as it goes from the bed plate side to the blade receiving plate side, therefore, the blades abutting on the inclined surface move toward the bed plate side. Accordingly, at least part of blades can contact one another at prescribed positions, therefore, sliding resistance in respective blades which contact one another occurring when the blades are expanded and moved can be stabilized in each operation.

The initial positions in the moving direction can be determined without variations as well as the sliding resistance in respective blades which contact one another occurring when the blades are expanded and moved can be stabilized as described above, therefore, it is possible to suppress variations in movement speed of blades at the time of continuous operation and to shorten the operation interval of blades.

DETAILED DESCRIPTION OF THE PREFERRED EMBODIMENTS

Hereinafter, an embodiment of the present invention will be explained with reference to the drawings.

(Optical Apparatus)

Figure 1:
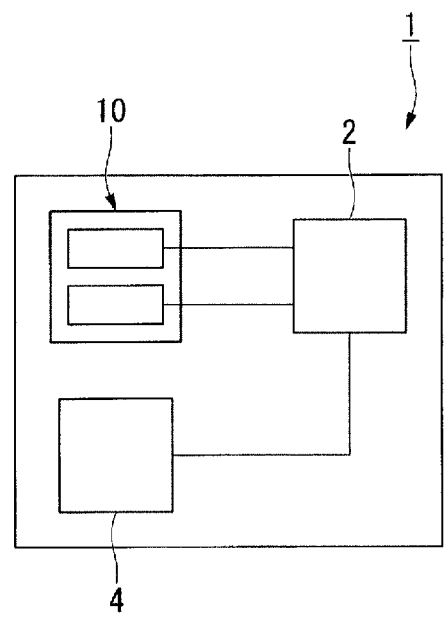
FIG. 1 is a block diagram of an optical apparatus.

FIG. 1 is a block diagram of an optical apparatus.

As shown in FIG. 1, an optical apparatus 1 is, for example, a digital camera, a still camera and so on, including a controller 2, an imaging device 4 and a blade drive device 10.

The controller 2 controls the entire operation of the optical apparatus 1, which includes a CPU (Central Processing Unit), a ROM (Read Only Memory), a RAM (Random Access Memory) and so on. The controller 2 controls the operation of the later-described blade drive device 10.

The imaging device 4 is, for example, a CCD (Charge Coupled Device) image sensor, a CMOS (Complementary Metal Oxide Semiconductor) image sensor or the like, which converts an object image formed by light into an electrical signal.

The optical apparatus 1 has a lens and so on for adjusting a focal length, though not shown in FIG. 1.

(Blade Drive Device)

Figure 2:
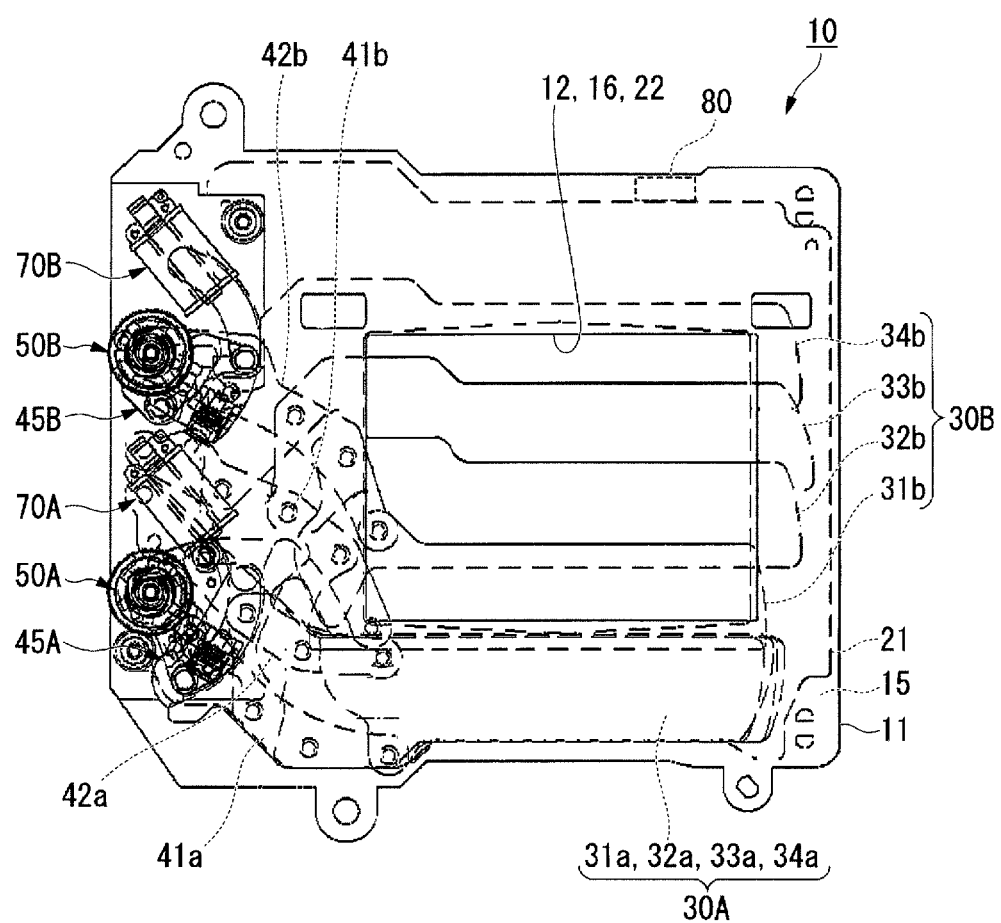
FIG. 2 is a front view of a blade drive device, showing a state just after an exposure is completed.
Figure 3:
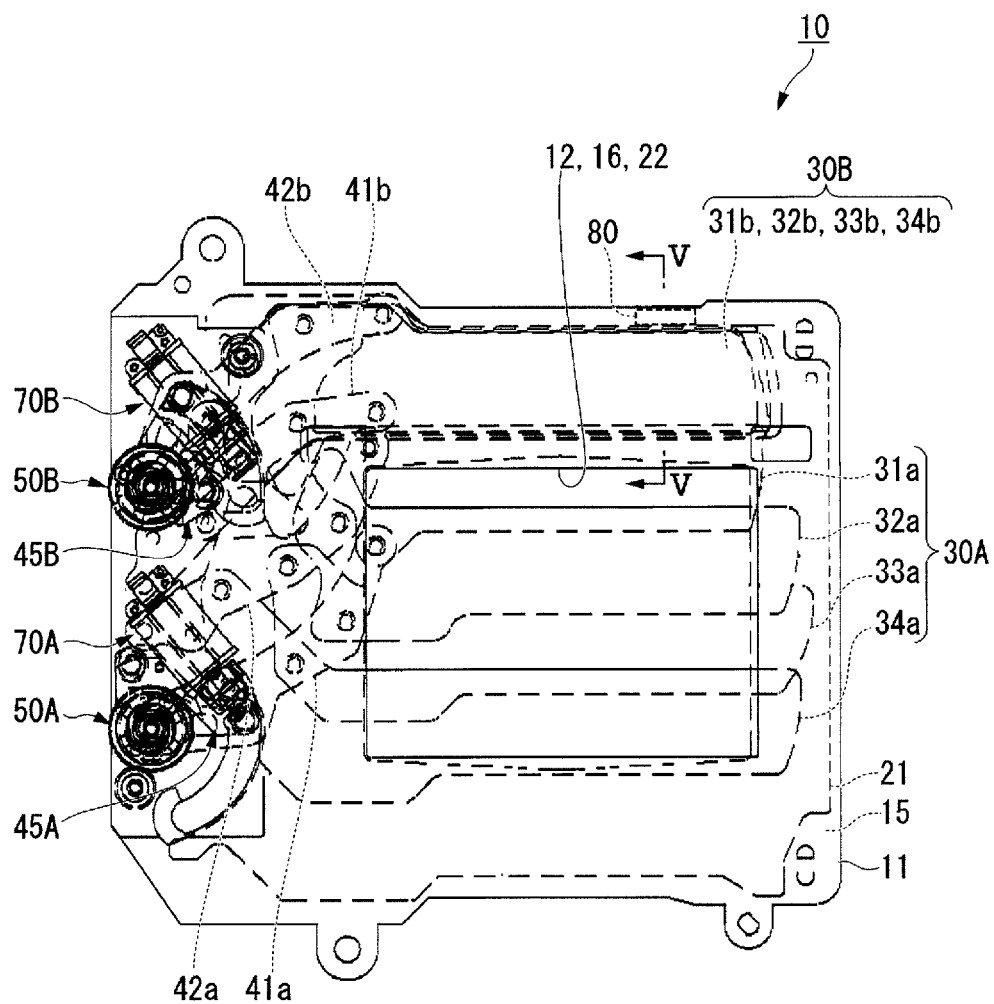
FIG. 3 is a front view of the blade drive device, showing an initial state.
Figure 4:
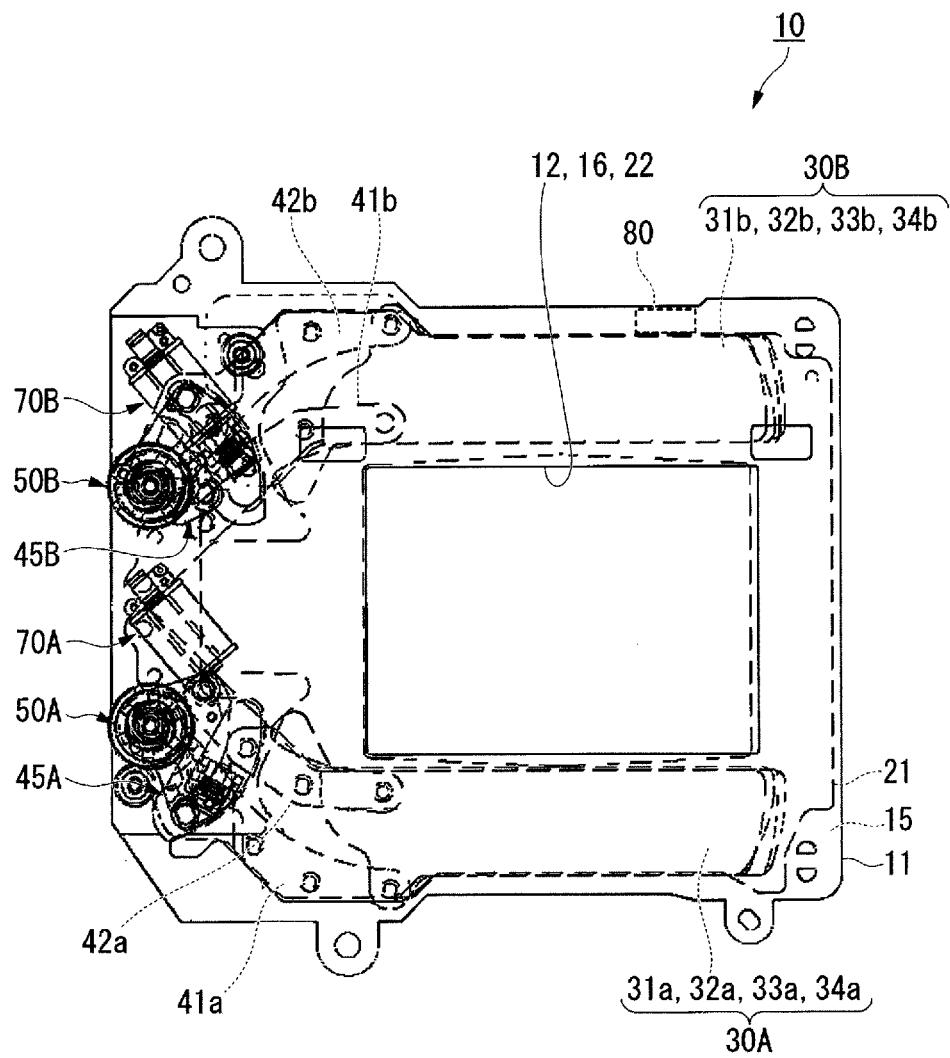
FIG. 4 is a front view of the blade drive device, showing a state during the exposure.
Figure 5:
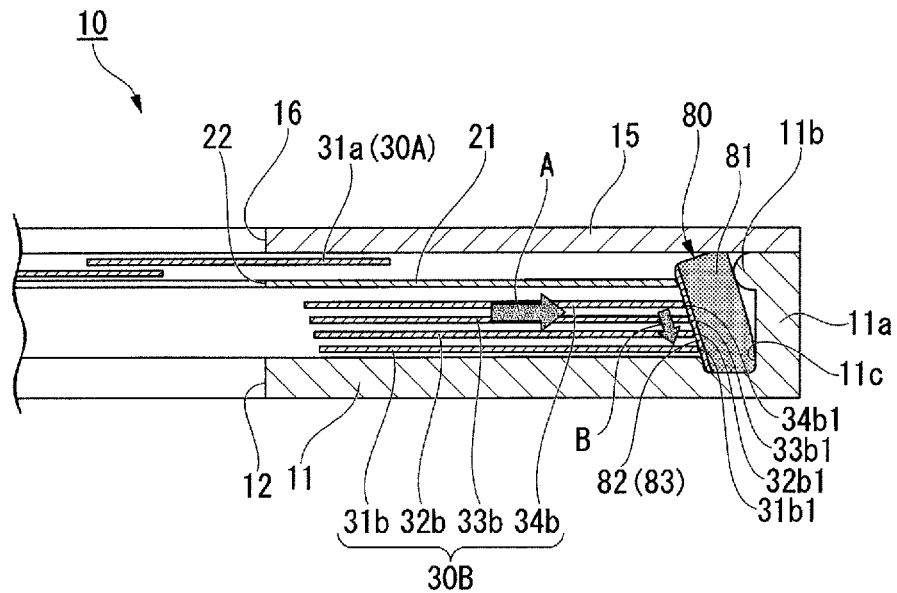
FIG. 5 is a cross-sectional view taken along V-V line of FIG. 3.

FIG. 2 to FIG. 4 are front views of the blade drive device, in which FIG. 2 shows a state just after an exposure is completed (exposure completion state), FIG. 3 shows an initial state (charging state) and FIG. 4 shows a state during the exposure. FIG. 5 is a cross-sectional view taken along V-V line of FIG. 3.

The blade drive device 10 is a so-called focal plane shutter. As shown in FIG. 2 to FIG. 4, the blade drive device 10 includes a bed plate 11, a blade receiving plate 15, a partition plate 21, blades 31a to 34a, 31b to 34b, drive arms 41a, 42a, 41b and 42b, electromagnets 70A, 70B and a regulating member 80.

As shown in FIG. 2, the bed plate 11 is made of a synthetic resin, having a rectangular opening 12. The bed plate 11 is a member arranged closest to a lens of the optical apparatus 1 in the blade drive device 10.

The blade receiving plate 15 is arranged in the back of the bed plate 11 so as to face the bed plate 11 (see FIG. 5). The blade receiving plate 15 is made of a synthetic resin, having a rectangular opening 16. The opening 16 of the blade receiving plate 15 is formed so as to almost correspond to the opening 12 of the bed plate 11 in plan view.

The partition plate 21 is arranged between the bed plate 11 and the blade receiving plate 15 so as to extend along the bad plate 11 and the blade receiving plate 15 (see FIG. 5). The partition plate 21 is made of a synthetic resin such as PET (polyethylene terephthalate), which is formed to be slightly smaller than the bed plate 11 and the blade receiving plate 15 in plan view. The partition plate 21 has a rectangular opening 22. The opening 22 of the partition plate 21 is formed so as to almost correspond to the opening 12 of the bed plate 11 and the opening 16 of the blade receiving plate 15 in plan view.

The blades 31a to 34a, 31b to 34b are expanded in a state where the openings 12, 16 and 22 are closed and overlap in a state where the openings 12, 16 and 22 are opened (see FIG. 2 to FIG. 4). The blades 31a to 34a, 31b to 34b are made of a synthetic resin and formed to be thin. The material of the blades 31a to 34a, 31b to 34b preferably has the same hardness as the partition plate 21, and is preferably the same as the material of the partition plate 21. The drive arms 41a, 42a, 41b and 42b are formed of metal thin plates for maintaining the strength. The blades 31a to 34a, 31b to 34b move between a position where the blades recede from the openings 12, 16 and 22 and a position where the blades overlap with at least part of the openings 12, 16 and 22. In the following explanation, a state where the blades 31a to 34a, 31b to 34b are expanded is referred to as an "expanded state" and positions of the blades 31a to 34a, 31b to 34b in the expanded state are referred to as "expanded positions". A state where the blades 31a to 34a, 31b to 34b are housed is referred to as a "housed state" and positions of the blades 31a to 34a, 31b to 34b in the housed state is referred to as "housed positions".

Four pieces of blades 31a to 34a form a front curtain 30A. The front curtain 30A is arranged between the blade receiving plate 15 and the partition plate 21. Four pieces of blades 31b to 34b form a rear curtain 30B. The rear curtain 30B is arranged between the bed plate 11 and the partition plate 21. FIG. 2 shows a state where the front curtain 30A is in the housed state and the rear curtain 30B is in the expanded state. In the case of FIG. 2, the front curtain 30A recedes from the openings 12, 16 and 22 and the rear curtain 30B closes the openings 12, 16 and 22.

The front curtain 30A is connected to the drive arms 41a, 42a. The rear curtain 30B is connected to the drive arms 41b, 42b. More specifically, the blade 31b is rotatably connected to the drive arms 41b, 42b. The blade 31b and the drive arms 41b, 42b function as a parallel link mechanism. The blade 32b is also rotatably connected to the drive arms 41b, 42b in the same manner as the blade 31b. Other blades 33b, 34b are also connected to the drive arms 41b, 42b by the same structure as the blades 31b, 32b. The connection between the front curtain 30A and the drive arms 41a, 42a is the same as the connection between the rear curtain 30B and the drive arms 41b, 42b. These drive arms 41a, 42a, 41b and 42b are supported by the bed plate 11 so as to swing freely.

The bed plate 11 is provided with a front curtain drive lever 45A and a rear curtain drive lever 45B for respectively driving the drive arms 41a, 42b. The front curtain drive lever 45A and the rear curtain drive lever 45B are supported by the bed plate 11 so as to swing in a given range. In more detail, the front curtain drive lever 45A is supported so as to swing around an axis formed in the bed plate 11, and a swinging range is prescribed by a groove formed in the bed plate 11. The same applies to the rear curtain drive lever 45B The drive arm 41a is connected to the front curtain drive lever 45A. The drive arm 42b is connected to the rear curtain drive lever 45B. When the front curtain drive lever 45A swings, the drive arm 41a swings, then, the front curtain 30A moves accordingly. Similarly, when the rear front drive lever 45B swings, the drive arm 42b swings, then, the rear curtain 30B moves accordingly.

The front curtain drive lever 45A and the rear curtain drive lever 45B respectively hold iron pieces. The front curtain drive lever 45A can swing between a position where the iron piece abuts on the electromagnet 70A and a position where the iron piece recedes from the electromagnet 70A. The same applies to the rear curtain drive lever 45B.

The front curtain drive lever 45A is biased in a direction away from the electromagnet 70A by a not-shown spring. Similarly, the rear curtain drive lever 45B is biased in a direction away from the electromagnet 70B by a not-shown spring.

Ratchet wheels 50A, 50B are engaged with the front curtain drive lever 45A and the rear curtain drive lever 45B through the above-described springs. One end of the spring biasing the front curtain drive lever 45A in the direction away from the electromagnet 70A is engaged with the ratchet wheel 50A, and the other end of the spring is engaged with the front curtain drive lever 45A. The biasing force of the spring can be adjusted by adjusting the rotation amount of the ratchet wheel 50A. The ratchet wheel 50B also has the same function as the ratchet wheel 50A.

The electromagnet 70A can adsorb the iron piece of the front curtain drive lever 45A when the power is applied. Similarly, the electromagnet 70B can also adsorb the iron piece of the rear curtain drive lever 45B when the power is applied.

As shown in FIG. 5, in the bed plate 11, a side wall 11a provided to stand from an outer edge portion of the bed plate 11 toward the blade receiving plate 15, a protrusion 11b protruding from a tip end portion of the side wall 11a toward the opening 12 side and a fitting groove 11c provided inside a base end portion of the side wall 11a are formed. The blade receiving plate 15 abuts on the tip end of the side wall 11a. The regulating member 80 is fitted into the fitting groove 11c.

The regulating member 80 is formed in a rectangular parallelepiped shape. The regulating member 80 is arranged between the bed plate 11 and the blade receiving plate 15 as well as between the blades 31b to 34b of the rear curtain 30B and the side wall 11a of the bed plate 11. An end portion of the regulating member 80 in the bed plate 11 side is fitted into the fitting groove 11c and fixed by an adhesive and so on. An end portion of the regulating member 80 in the blade receiving plate 15 side abuts on the blade receiving plate 15 and is sandwiched by the protrusion 11b of the bed plate 11 and an end edge of the partition plate 21. The regulating member 80 has a main body 81 and an abutting surface 82 held by the main body 81.

The main body 81 is formed of an elastic member. As materials for forming the main body 81, for example, a urethane foam, rubber and so on are preferable.

The abutting surface 82 is formed of a material having a higher hardness than a hardness of the main body 81. In the embodiment, the abutting surface 82 is formed by bonding a plate member made of PET to the main body 81 to be held by the main body 81. The material forming the abutting surface 82 is not limited to PET, and resin materials other than PET or metal materials such as aluminum can be used.

When the blades 31b to 34b of the rear curtain 30B are housed, side edge portions 31b1 to 34b1 of the blades 31b to 34b in the side wall 11a side of the bed plate 11 abut on the abutting surface 82. The abutting surface 82 is formed in a smooth flat surface so that friction with respect to the blades 31b to 34b is reduced.

The regulating member 80 is provided in an inclined state with respect to the side wall 11a by the protrusion 11b by being fitted into the fitting groove 11c of the bed plate 11. Specifically, the regulating member 80 is arranged so as to be separated from the side wall 11a as it goes from the bed plate 11 side to the blade receiving plate 15 side by the protrusion 11b. Accordingly, the entire of the abutting surface 82 of the regulating member 80 is an inclined surface 83 inclined to the bed plate 11 side as it goes from the bed plate 11 side toward the blade receiving plate 15 side.

Next, the operation of the blade drive device 10 will be explained.

As shown in FIG. 3, in the blade drive device 10, a not-shown setting lever is fixed in an initial position in the initial state, the front curtain 30A is in the expanded state and the rear curtain 30B is in the housed state. In this initial state, the iron pieces of the front curtain drive lever 45A and the rear curtain drive lever 45B are set in the initial state where the iron pieces abut on the electromagnets 70A, 70B and can be adsorbed on the electromagnets 70A, 70B, respectively.

At the time of imaging, when a release button of the optical apparatus 1 is pressed, the power is applied to coils of the electromagnet 70A, 70B, the iron piece of the front curtain drive lever 45A is adsorbed on the electromagnet 70A and the iron piece of the rear curtain drive lever 45B is adsorbed on the electromagnet 70B. After that, the setting lever retreats from the front curtain drive lever 45A and the rear curtain drive lever 45B. Here, the front curtain drive lever 45A and the rear curtain drive lever 45B are held in a state of being adsorbed on the electromagnets 70A and 70B respectively.

After that, when the power application with respect to the coil of the electromagnet 70A is cut off, the front curtain drive lever 45A rotates in a clockwise direction in accordance with the biasing force of the spring as shown in FIG. 4. Accordingly, the front curtain 30A recedes from the openings 12, 16 and 22 to become in the housed state. Moreover, the power application to the coil of the electromagnet 70B is maintained for a given period of time, and the rear curtain 30B is maintained in the housed state of receding from the openings 12, 16 and 22. Accordingly, the openings 12, 16 and 22 are in an opened state (exposed state).

After a given period of time passes from the time when the release button is pressed, the power application to the coil of the electromagnet 70B is cut off, and the rear curtain drive lever 45B rotates in the clockwise direction by the biasing force of the spring. Accordingly, the rear curtain 30B is expanded and closes the openings 12, 16 and 22 as shown in FIG. 2. One imaging is completed as described above.

Next, the front curtain drive lever 45A and the rear curtain drive lever 45B are rotated in a counterclockwise direction by the not-shown setting lever. Accordingly, the front curtain 30A is expanded and closes the openings 12, 16 and 22, and the rear curtain 30B is housed and recedes from the openings 12, 16 and 22 to be returned to the initial state shown in FIG. 3.

At this time, the side edge portions 31b1 to 34b1 of the blades 31b to 34b of the rear curtain 30B in the side wall 11a side abut on the abutting surface 82 of the regulating member 80 as shown in FIG. 5.

Here, the abutting surface 82 is the inclined surface 83 inclined to the bed plate 11 side as it goes from the bed plate 11 side to the blade receiving plate 15 side. A vector of the driving force acting on the blades 31b to 34b is changed from a direction in which the blades 31b to 34b go from the expanded position to the regulating member 80 (a direction directed by an arrow A) to a direction along the inclined surface 83 (a direction directed by an arrow B) when the side edge portions 31b1 to 34b1 abut on the inclined surface 83. Accordingly, the blades 31b to 34b slide on the inclined surface 83 and move toward the bed plate 11 side after the side edge portions 31b1 to 34b1 abut on the inclined surface 83. As a result, the blades 31b to 34b are positioned to the housed position in a state of contacting one another. Therefore, the blade drive device 10 can stabilize sliding resistance in respective blades 31b to 34b occurring when the blades 31b to 34b move from the housed position toward the expanded position.

As described above, the blade drive device 10 according to the embodiment includes the bed plate 11 having the opening 12, the blade receiving plate 15 arranged so as to face the bed plate 11, plural blades 31b to 34b provided between the bed plate 11 and the blade receiving plate 15, which are expanded in a state where the opening 12 is closed and are housed while overlapping one another in a state where the opening 12 is opened, and the regulating member 80 having the abutting surface 82 on which the side edge portions 31b1 to 34b1 of the blades 31b to 34b abut when the blades 31b to 34b are housed. The abutting surface 82 is the inclined surface 83 inclined to the bed plate 11 side as it goes from the bed plate 11 side to the blade receiving plate 15 side.

According to the above structure, the regulating member 80 having the abutting surface 82 on which the side edge portions 31b1 to 34b1 of the blades 31b to 34b abut when the blades 31b to 34b are housed is included, therefore, positions of the side edge portions 31b1 to 34b1 of the blades 31b to 34b in the moving direction are regulated by the regulating member 80 when the blades 31b to 34b are housed. Accordingly, the initial positions of the blades 31b to 34b in the moving direction can be determined without variations in each operation.

As the abutting surface 82 is the inclined surface 83 inclined to the bed plate 11 side as it goes from the bed plate 11 side to the blade receiving plate 15 side, the blades 31b to 34b abutting on the inclined surface 83 move toward the bed plate 11 side. Accordingly, the blades 31b to 34b can contact one another at prescribed positions, therefore, the sliding resistance in respective blades 31b to 34b which contact one another occurring when the blades are expanded and moved can be stabilized in each operation.

The initial positions in the moving direction can be determined without variations as well as the sliding resistance in respective blades 31b to 34b which contact one another occurring when the blades are expanded and moved can be stabilized as described above, therefore, it is possible to suppress variations in movement speed of the blades 31b to 34b at the time of continuous operation and to shorten the operation interval of the blades 31b to 34b.

As the inclined surface 83 is provided on the entire surface of the abutting surface 82, all the blades 31b to 34b can be positively moved from the blade receiving plates 15 side toward the bed plate 11 side at the time of housing the blades 31b to 34b. Accordingly, respective blades 31b to 34b can contact one another at prescribed positions over an area from the blade receiving plate 15 side to the bed plate 11 side, therefore, the sliding resistance of respective blades 31b to 34b which contact one another occurring when the blades are expanded and moved can be stabilized in each operation. As a result, it is possible to suppress variations in movement speed of the blades 31b to 34b at the time of continuous operation and to shorten the operation interval of the blades 31b to 34b.

As the hardness of the abutting surface 82 is higher than the hardness of the main body 81, the blades 31b to 34b can be slid on the inclined surface 83 smoothly while suppressing generation of dust such as abrasion powder when the blades 31b to 34b abuts on the abutting surface 82 of the regulating member 80 at the time of housing the blades 31b to 34b. Therefore, the blade drive device 10 with excellent reliability which can further shorten the operation interval of the blades 31b to 34b can be obtained.

Moreover, as the main body 81 of the regulating member 80 is formed of an elastic member, the impact generated when the blades 31b to 34b abut on the abutting surface 82 of the regulating member 80 at the time of housing the blades 31b to 34b can be absorbed by the main body 81 of the regulating member 80. Accordingly, it is possible to prevent damage on the blades 31b to 34b, which can improve the durability of the blade drive device 10.

As the optical apparatus 1 according to the embodiment has the blade drive device 10, variations in movement speed of the blades 31b to 34b at the time of continuous operation can be suppressed and the operation interval of the blades 31b to 34b can be shortened, therefore, the optical apparatus 1 with a higher frame speed can be obtained.

The present invention is not limited to the above embodiment explained with reference to the drawings, and various modification examples may be considered within a technical scope thereof.

For example, the regulating member 80 is fixed to the bed plate 11 by being fitted into the fitting groove 11c of the bed plate 11 in the above embodiment, however, the present invention is not limited to this. The regulating member may be integrally formed with the bed plate 11 as well as may be attached to the blade receiving plate 15 or the partition plate 21.

Figure 6:
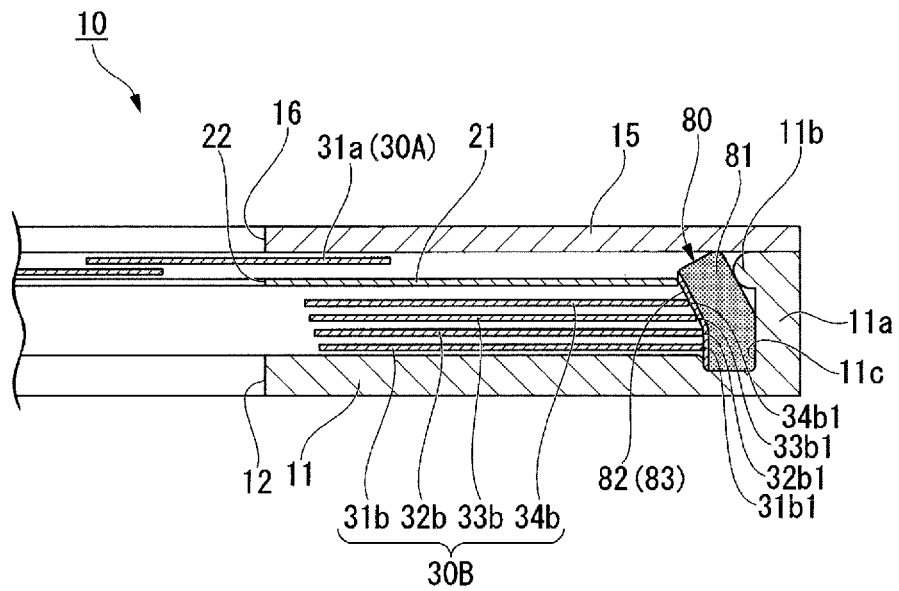
FIG. 6 is an explanatory view of a blade drive device according to a modification example, which is a cross-sectional view of a part taken along V-V line of FIG. 3.

Although the inclined surface 83 of the regulating member 80 is provided on the entire surface of the abutting surface 82 in the above embodiment, the present invention is not limited to this. The same effects can be obtained as long as at least part of the abutting surface 82 is the inclined surface 83. The inclined surface 83 of the regulating member 80 may be provided in an end portion of the regulating member 80 in the blade receiving plate 15 side as shown in FIG. 6.

According to the structure, the inclined surface 83 is provided in the end portion of the regulating member 80 in the blade receiving plate 15 side, therefore, the blades 31b to 34b can be moved from the blade receiving plate 15 side toward the bed plate 11 side when the blades 31b to 34b are housed. Accordingly, as respective blades 31b to 34b can contact one another at prescribed positions over the area from the blade receiving plate 15 side to the bed plate 11 side, the sliding resistance of respective blades 31b to 34b which contact one another occurring when the blades are expanded and moved can be stabilized in each operation. As a result, it is possible to suppress variations in movement speed of the blades 31b to 34b at the time of continuous operation and to shorten the operation interval of the blades 31b to 34b.

Also in the above embodiment, the regulating member 80 is formed in the rectangular parallelepiped shape and is inclined to the side wall 11a by the protrusion 11b of the bed plate 11, however, the present invention is not limited to this.

Figure 7:
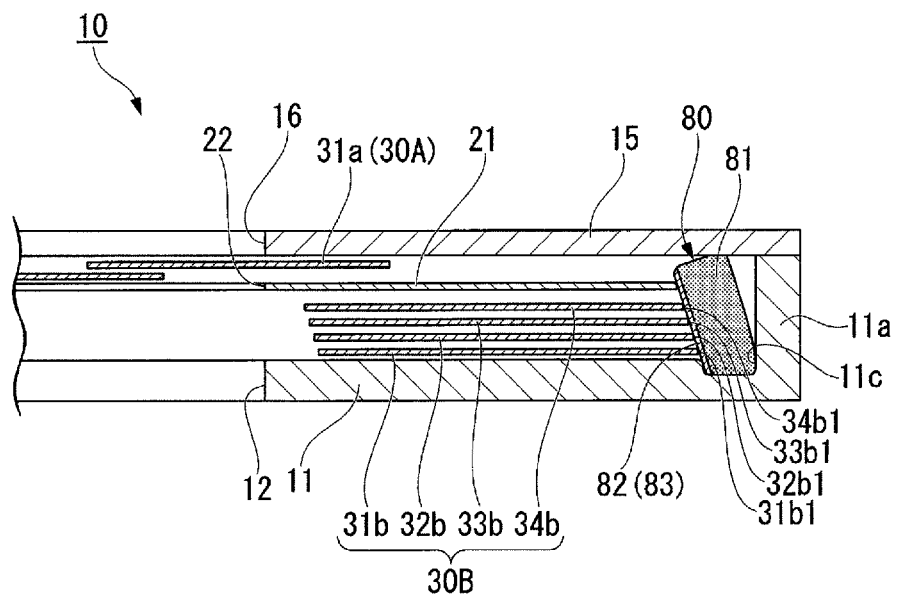
FIG. 7 is an explanatory view of a blade drive device according to a modification example, which is a cross-sectional view of a part taken along V-V line of FIG. 3.
Figure 8:
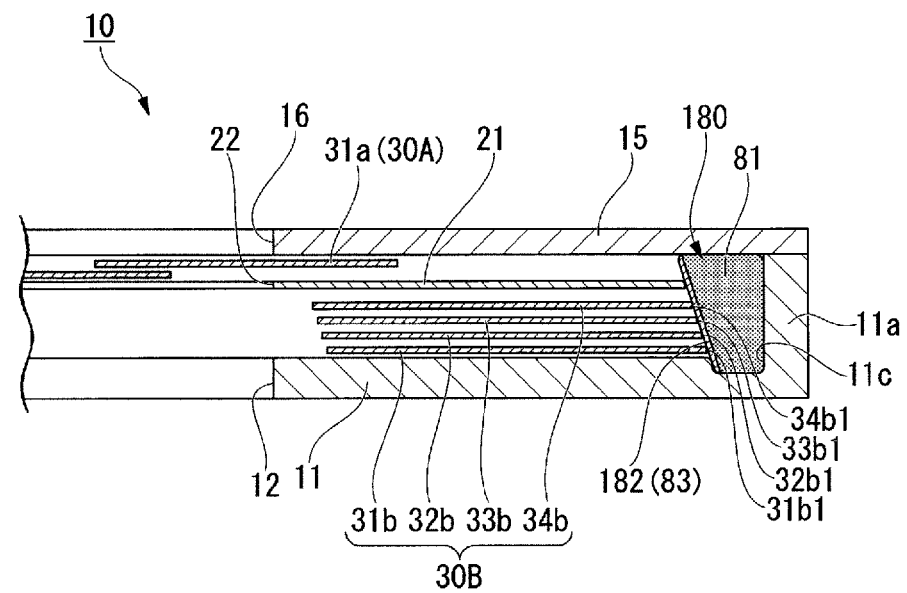
FIG. 8 is an explanatory view of a blade drive device according to a modification example, which is a cross-sectional view of a part taken along V-V line of FIG. 3.

For example, the regulating member 80 can be inclined with respect to the side wall 11 and thus the abutting surface 82 is inclined by pressing the end portion of the regulating member 80 in the blade receiving plate 15 side toward the bed plate 11 side by the blade receiving plate 15 as shown in FIG. 7. Furthermore, a regulating member 180 may be formed in a trapezoid block shape in cross section having an abutting surface 182 (inclined surface 83) inclined to the bed plate 11 side as it goes from the blade receiving plate 15 side to the bed plate 11 side as shown in FIG. 8.

Although the regulating member 80 is arranged so as to abut on the side edge portions 31b1 to 34b1 of the blades 31b to 34b in the rear curtain 30B in the housed state, the present invention is not limited to this. It is also preferable to provide a regulating member arranged so as to abut on side edge portions of the blades 31a to 34a in the front curtain 30A in the housed state.

According to the structure, variations in housed positions of the blades 31a to 34a of the front curtain 30A in the housed state can be suppressed. Accordingly, in the case where the blade drive device 10 performs an exposure at the time of moving the rear curtain 30B from the expanded position to the housed position, it is possible to suppress variations in movement speed of the blades 31a to 34a at the time of moving the front curtain 30A from the housed position to the expanded position. Therefore, the operation interval of the blades 31a to 34a can be shortened.

Although the blade drive device 10 according to the embodiment is operated by a so-called spring drive system in which the exposure is performed by driving the blades 31b to 34b by the biasing force of the spring, the present invention is not limited to this. Even when the blade drive device is operated by a so-called electromagnetic drive system in which the exposure is performed by the driving force of an electromagnetic actuator, the same effects can be obtained by applying the above structure.

Furthermore, it is possible to appropriately replace the components of the above embodiment with well-known components within a scope not departing from the gist of the present invention.

What is claimed is:

1. A blade drive device comprising:
   a bed plate having an opening;
   a blade receiving plate arranged in parallel with the bed plate so as to face the bed plate in a thickness direction of the blade drive device, the thickness direction being perpendicular to both bed plate and blade receiving plate;
   a plurality of blades provided in an overlapping manner in the thickness direction between the bed plate and the blade receiving plate, wherein the plurality of blades are operable to expand to a first position at which the plurality of blades reduces their overlapping areas among them to close the opening and contract to a second position at which the plurality of blades increases their overlapping areas among them to open the opening; and
   a regulating member provided between the bed plate and the blade receiving plate and having an abutting surface extensive between the bed plate and the blade receiving plate, the abutting surface comprising an inclined surface inclined from the thickness direction, wherein the inclined surface is positioned so that when the plurality of blades are at the second position, side edge portions of the blades are in abutment against the inclined surface and in inclined alignment along the inclined surface in the thickness direction.

2. The blade drive device according to claim 1, wherein the inclined surface is provided in an end portion of the regulating member on a side of the blade receiving plate.

3. The blade drive device according to claim 1, wherein the inclined surface extends in an entire surface of the abutting surface.

4. The blade drive device according to claim 1, wherein the abutting surface is held by a main body of the regulating member, and made of a material harder than that of the main body.

5. The blade drive device according to claim 4, wherein the main body of the regulating member is formed of an elastic member.

6. An optical apparatus comprising a blade drive device according to claim 1.

* * * * *